US011751141B2

(12) United States Patent
Wu et al.

(10) Patent No.: US 11,751,141 B2
(45) Date of Patent: Sep. 5, 2023

(54) DISCONTINUOUS RECEPTION OPERATION FOR SIDELINK COMMUNICATION

(71) Applicant: QUALCOMM Incorporated, San Diego, CA (US)

(72) Inventors: Zhibin Wu, Los Altos, CA (US); Hong Cheng, Basking Ridge, NJ (US); Kapil Gulati, Hillsborough, NJ (US); Sudhir Kumar Baghel, Hillsborough, NJ (US); Tien Viet Nguyen, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 16/947,510

(22) Filed: Aug. 4, 2020

(65) Prior Publication Data

US 2021/0051587 A1 Feb. 18, 2021

Related U.S. Application Data

(60) Provisional application No. 62/887,257, filed on Aug. 15, 2019.

(51) Int. Cl.
| | |
|---|---|
| *H04W 76/28* | (2018.01) |
| *H04W 76/23* | (2018.01) |
| *H04W 52/02* | (2009.01) |
| *H04W 68/02* | (2009.01) |
| *H04W 72/20* | (2023.01) |

(52) U.S. Cl.
CPC ....... *H04W 52/0235* (2013.01); *H04W 68/02* (2013.01); *H04W 72/20* (2023.01); *H04W 76/23* (2018.02); *H04W 76/28* (2018.02)

(58) Field of Classification Search
CPC ..... H04W 76/14; H04W 76/23; H04W 76/28; H04W 92/18; H04W 52/0235
See application file for complete search history.

(56) References Cited

U.S. PATENT DOCUMENTS

| | | | |
|---|---|---|---|
| 2019/0174411 A1* | 6/2019 | Xu | H04W 72/0406 |
| 2022/0191962 A1* | 6/2022 | Di Girolamo | H04W 36/305 |

FOREIGN PATENT DOCUMENTS

| | | |
|---|---|---|
| CN | 109041146 A | 12/2018 |
| EP | 3358895 A1 | 8/2018 |
| EP | 3500028 A1 | 6/2019 |
| WO | 2017078783 A1 | 5/2017 |

OTHER PUBLICATIONS

International Search Report and Written Opinion—PCT/US2020/070370—ISA/EPO—dated Dec. 22, 2020.

(Continued)

*Primary Examiner* — Hoon J Chung
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication that the UE is to transition to a sidelink discontinuous reception (DRX) sleep mode. The UE may transition to the sidelink DRX sleep mode based at least in part on transmitting the indication. Numerous other aspects are provided.

30 Claims, 7 Drawing Sheets

(56) References Cited

OTHER PUBLICATIONS

"LTE; Evolved Universal Terrestrial Radio Access (E-UTRA); Medium Access Control (MAC) Protocol Specification (3GPP TS 36.321 Version 13.9.0 Release 13)",ETSI Technical Specification, European Telecommunications Standards Institute (ETSI), 650, Route Des Lucioles, F-06921 Sophia-Antipolis, France, vol. 3GPP RAN, No. V13.9.0, Jul. 16, 2018 (Jul. 16, 2018), 92 pages, XP014320636, Retrieved from the Internet: URL: http://www.etsi.org/deliver/etsi_ts/136300_136399/136321/13.09.00_60/ts_136321v130900p.pdf [retrieved on Jul. 16, 2018] Paragraph [05.7].
Partial International Search Report—PCT/US2020/070370—ISA/EPO—dated Oct. 28, 2020.

\* cited by examiner

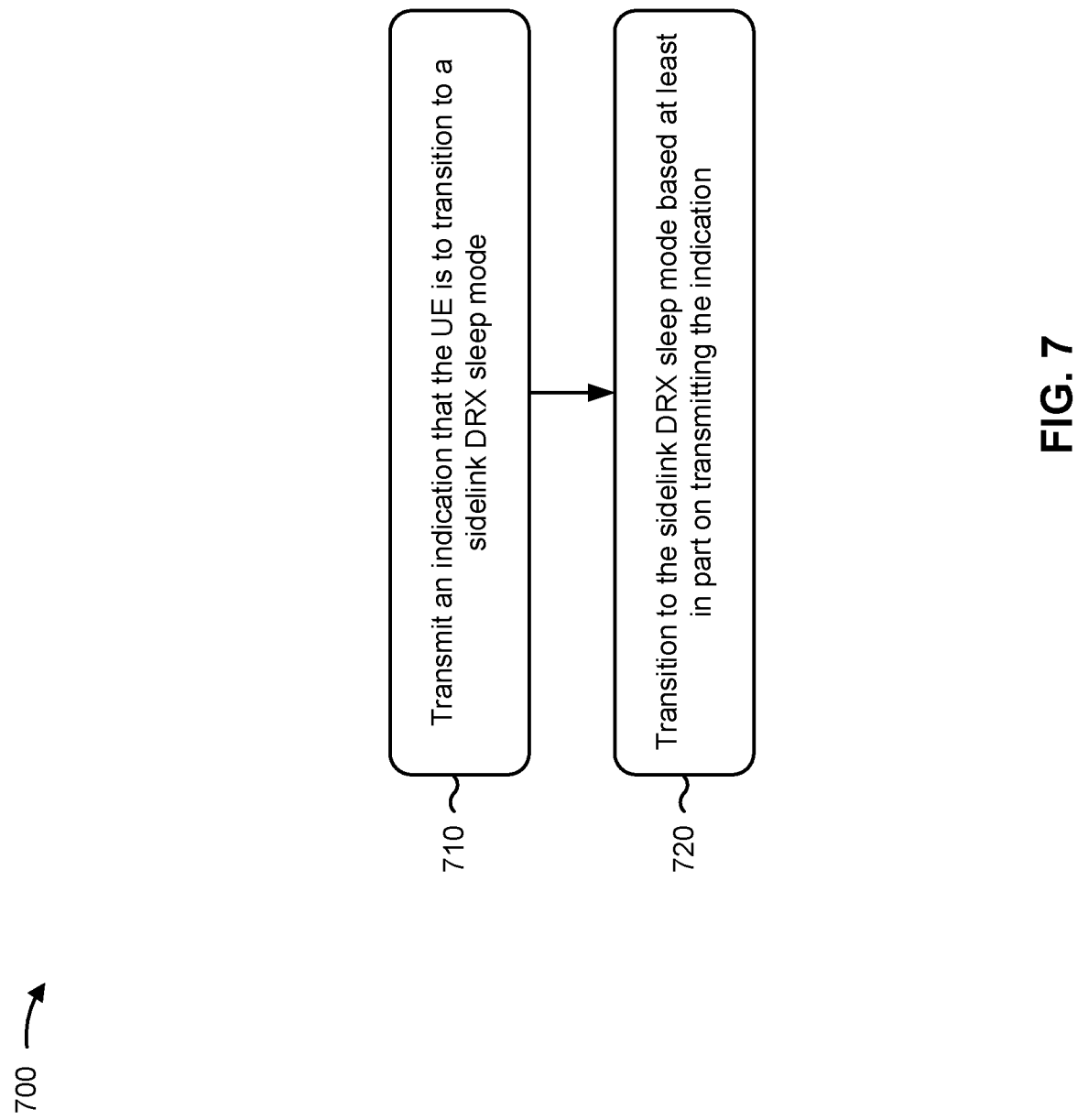

DISCONTINUOUS RECEPTION OPERATION FOR SIDELINK COMMUNICATION

CROSS-REFERENCE TO RELATED APPLICATION

This patent application claims priority to U.S. Provisional Patent Application No. 62/887,257, filed on Aug. 15, 2019, entitled "DISCONTINUOUS RECEPTION OPERATION FOR SIDELINK COMMUNICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for discontinuous reception (DRX) operation for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting an indication that the UE is to transition to a sidelink discontinuous reception (DRX) sleep mode; and transitioning to the sidelink DRX sleep mode based at least in part on transmitting the indication.

In some aspects, a UE for wireless communication may include memory and one or more processors operatively coupled to the memory. The memory and the one or more processors may be configured to transmit an indication that the UE is to transition to a sidelink DRX sleep mode; and transition to the sidelink DRX sleep mode based at least in part on transmitting the indication.

In some aspects, a non-transitory computer-readable medium may store one or more instructions for wireless communication. The one or more instructions, when executed by one or more processors of a UE, may cause the one or more processors to: transmit an indication that the UE is to transition to a sidelink DRX sleep mode; and transition to the sidelink DRX sleep mode based at least in part on transmitting the indication.

In some aspects, an apparatus for wireless communication may include means for transmitting an indication that the apparatus is to transition to a sidelink DRX sleep mode; and means for transitioning to the sidelink DRX sleep mode based at least in part on transmitting the indication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
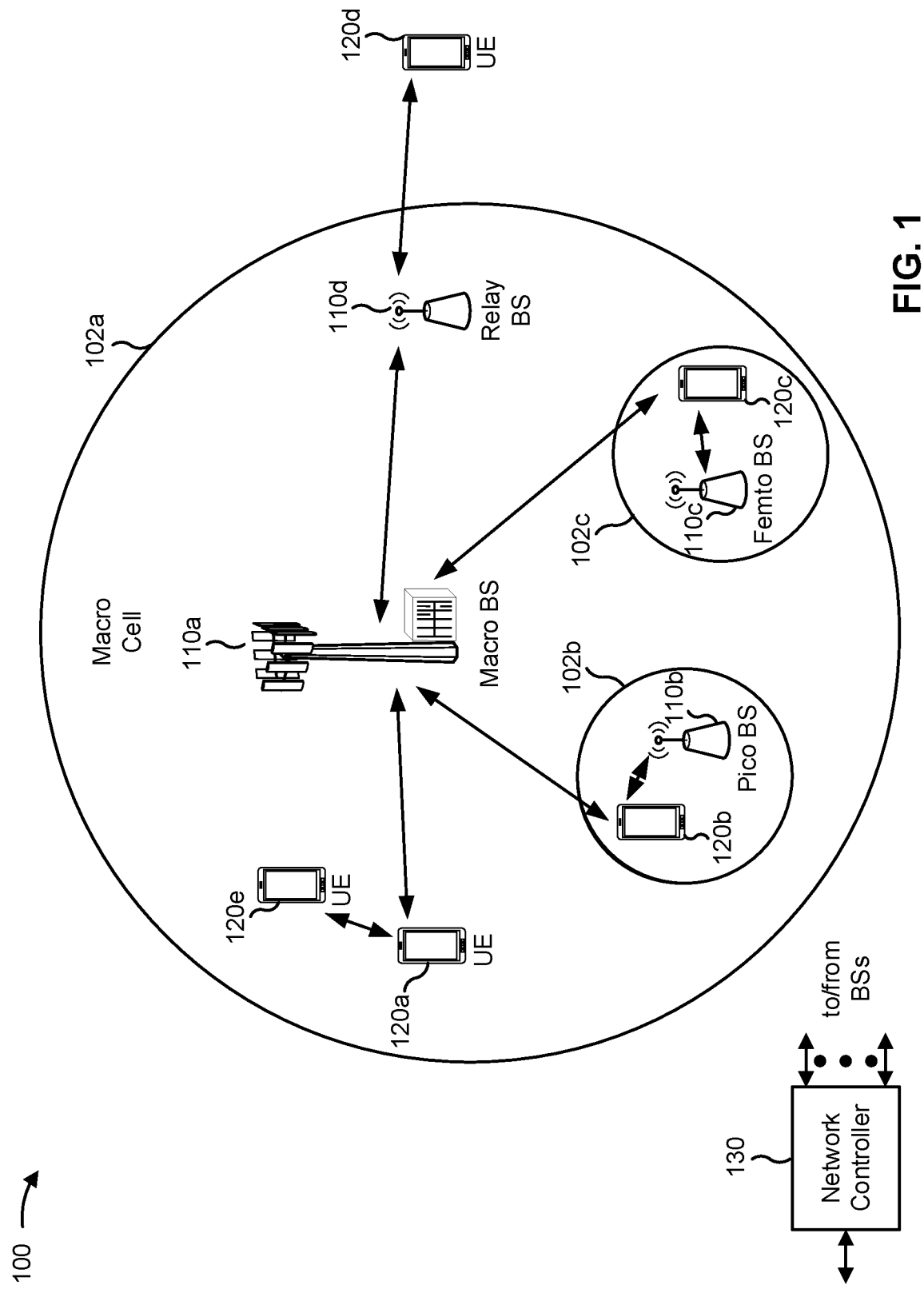
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
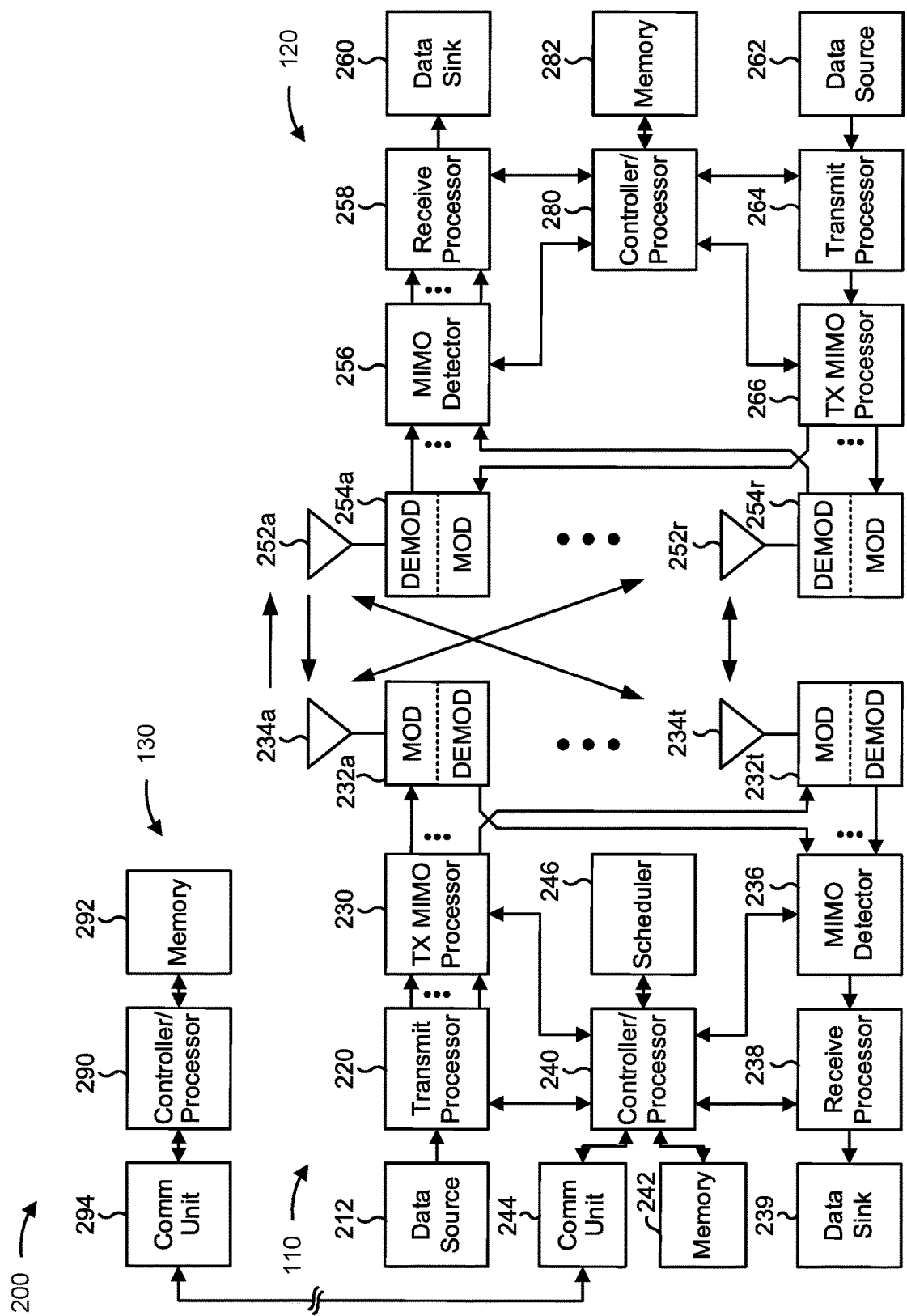
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with discontinuous reception (DRX) operation for sidelink communication, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for transmitting an indication that the UE is to transition to a sidelink DRX sleep mode, means for transitioning to the sidelink DRX sleep mode based at least in part on transmitting the indication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may perform DRX operation for an access link between the UE and a BS to conserve battery life of the UE. DRX operation may include transitioning to a DRX sleep mode for a DRX sleep duration. In the DRX sleep mode, the UE may refrain from transmitting or receiving on the access link, may deactivate particular subcarriers or component carriers (e.g., if carrier aggregation is implemented on the access link) of the access link, may deactivate one or more components of the UE, and/or the like. Moreover, DRX operation may include periodically transitioning out of the DRX sleep mode and into a DRX on mode (or activate mode) for a DRX on duration to monitor for downlink communications from a BS. In some cases, the BS may transmit an instruction to the UE to perform DRX operation, to transition to a DRX sleep mode, and/or the like.

In some cases, a UE may be configured to communicate with another UE (or an integrated access and backhaul (IAB) node may be configured to communicate with another IAB node) over a sidelink, which may be referred to as sidelink communication. In some cases, sidelink communication between UEs might not be scheduled by a BS and may occur at any time. For example, one or more of the UEs may be operating outside of a coverage area of a serving BS or may not be communicatively connected with a serving BS, in which case the one or more UEs may autonomously (or semi-autonomously) schedule the transmission of sidelink communications on the sidelink (e.g., which may be referred to as Mode 2 sidelink operation). In this case, the BS may be unable to configure DRX operation for a UE, may be unable to instruct the UE to operate in a particular DRX mode, and/or the like.

Some aspects described herein provide techniques and apparatuses for DRX operation for sidelink communication. In some aspects, a UE may be capable of performing sidelink DRX operation in various connectivity modes, such as a connected mode (e.g., a radio resource control (RRC) connected mode, in which the UE is communicatively connected with one or more other UEs on one or more sidelinks), an inactive mode (e.g., an RRC inactive mode, in which the UE suspends an RRC configuration for the one or more sidelinks), an idle mode (e.g., an RRC idle mode, in which the UE is not RRC connected on a sidelink), and/or the like.

For example, the UE may operate in a sidelink idle mode, and may initiate sidelink DRX operation by transmitting, to one or more other UEs, an indication that the UE is to enter sidelink DRX operation, is to transition to a sidelink DRX sleep mode, and/or the like, may initiate sidelink DRX operation, may transition to the sidelink DRX sleep mode, and/or the like. In this way, the UE is capable of notifying other UEs of the sidelink DRX operation of the UE, and the other UEs may refrain from transmitting sidelink communications to the UE while the UE is operating in the sidelink DRX sleep mode, may transmit sidelink communications to the UE and/or may establish sidelink RRC connections with the UE while the UE is operating in a sidelink DRX on mode, and/or the like.

As another example, the UE may operate in a sidelink connected mode (e.g., the UE may be communicatively connected with one or more other UEs), and may coordinate and/or synchronize sidelink DRX operation with the one or more other UEs. In this way, the UE and the other UEs may synchronize sidelink DRX sleep modes and/or sidelink DRX on modes to increase the battery life conservation of the UE and the one or more UEs provided by sidelink DRX operation.

Figure 3:
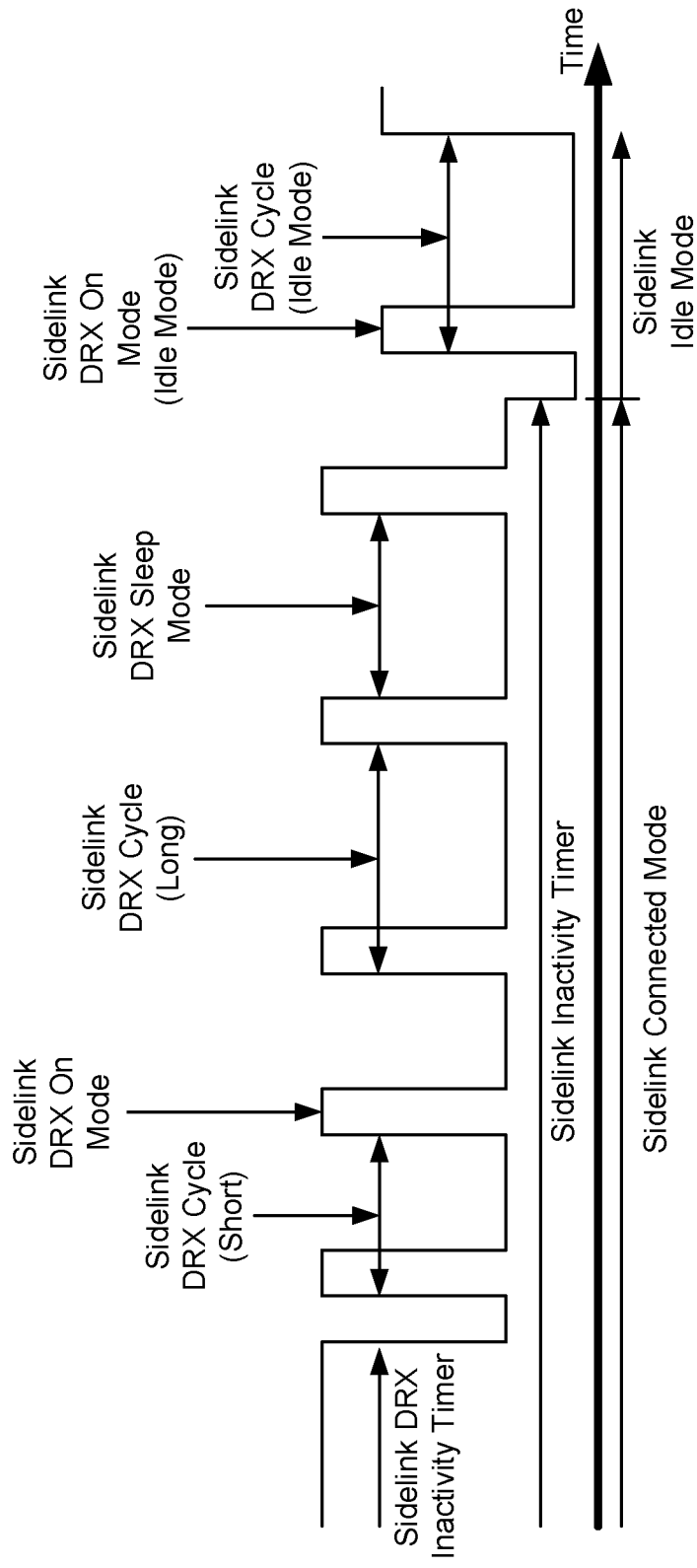
FIGS. 3-6 are diagrams illustrating examples of discontinuous reception (DRX) operation for sidelink communication, in accordance with various aspects of the present disclosure.

FIG. 3 is a diagram illustrating one or more examples 300 of DRX operation for sidelink communication, in accordance with various aspects of the present disclosure. In some aspects, example(s) 300 may illustrate an example of sidelink DRX operation of a UE (e.g., UE 120). Other examples of configurations may be used for sidelink DRX operation of a UE. As shown in FIG. 3, the UE may perform sidelink DRX operation in various sidelink connectivity modes, such as a sidelink connected mode (e.g., an RRC connected mode on one or more sidelinks) and a sidelink idle mode (e.g., an RRC idle mode). In some aspects, the UE may perform sidelink DRX operation in other sidelink connectivity modes, such as a sidelink inactive mode (e.g., an RRC inactive mode on one or more sidelinks), and/or the like. The different DRX modes on the sidelink permit fast resumption of the sidelink and start transmission on the sidelink without going through a full sidelink establishment process of address discovery, authentication, Internet protocol (IP) address configuration, key derivation, and/or the like. During the transition between the different DRX modes, signaling between UEs may permit a fast re-key operation, so that the security level of the sidelink communication is not affected.

As further shown in FIG. 3, the UE may initiate sidelink DRX operation based at least in part on expiration of a sidelink DRX inactivity timer. In some aspects, the UE may initiate sidelink DRX operation prior to expiration of the sidelink DRX inactivity timer, such as based at least in part on expiration of a sidelink inactivity timer (e.g., which may cause the UE to transition from the sidelink connected mode to the sidelink idle mode), based at least in part on operation of another UE, and/or the like.

In some aspects, the UE may determine whether the sidelink DRX inactivity timer is expired based at least in part on a time duration since the UE last transmitted and/or received a sidelink communication. For example, the UE may determine that the sidelink DRX inactivity timer has expired based at least in part on not transmitting and/or receiving a sidelink communication during the time duration, based at least in part on transmitting and/or receiving a quantity of sidelink communications, during the time duration, that does not satisfy a threshold quantity, and/or the like.

Similarly, the UE may determine whether the sidelink inactivity timer is expired based at least in part on a time duration since the UE last transmitted and/or received a sidelink communication. The time duration associated with the sidelink inactivity timer may be different (e.g., longer) relative to the time duration associated with the sidelink DRX inactivity timer. For example, the UE may determine that the sidelink inactivity timer has expired based at least in part on not transmitting and/or receiving a sidelink communication during the time duration, based at least in part on transmitting and/or receiving a quantity of sidelink communications, during the time duration, that does not satisfy a threshold quantity, and/or the like.

As further shown in FIG. 3, the UE may perform sidelink DRX operation based at least in part on a sidelink DRX cycle. The sidelink DRX cycle may include a combination of a sidelink DRX on mode and a sidelink DRX sleep mode. The UE may operate in the sidelink DRX sleep mode for a sidelink DRX sleep duration. In the sidelink DRX sleep mode, the UE may refrain from transmitting or receiving on the sidelink, may deactivate particular subcarriers or component carriers (e.g., if carrier aggregation is implemented on the sidelink) of the sidelink, may deactivate one or more components of the UE, and/or the like. Moreover, the UE may operate in the sidelink DRX on mode for a sidelink DRX on duration to monitor for sidelink communications from other UEs, to transmit sidelink communications to other UEs, and/or the like. The combination of the sidelink DRX sleep duration and the sidelink DRX on duration may be referred to as the sidelink DRX cycle duration of the sidelink DRX cycle.

As further shown in FIG. 3, the sidelink DRX operation of the UE may include various types of sidelink DRX cycles, such as a short sidelink DRX cycle, a long sidelink DRX cycle, and/or the like. The sidelink DRX cycle duration of the short sidelink DRX cycle may be shorter relative to the sidelink DRX cycle duration of the long sidelink DRX cycle (e.g., the sidelink DRX cycle duration of the short sidelink DRX cycle may be fewer symbols relative to the sidelink DRX cycle duration of the long sidelink DRX cycle, the sidelink DRX cycle duration of the short sidelink DRX cycle may be fewer slots relative to the sidelink DRX cycle duration of the long sidelink DRX cycle, the sidelink DRX cycle duration of the short sidelink DRX cycle may be fewer subframes relative to the sidelink DRX cycle duration of the long sidelink DRX cycle, and/or the like). As an example, a short DRX cycle duration may be 5 subframes and a long DRX cycle duration may be 10 subframes. As an example, a short DRX cycle duration may be 10 subframes and a long DRX cycle duration may be 20 subframes. In some aspects, the UE may transition from short sidelink DRX cycles to long sidelink DRX cycles based at least in part on not transmitting and/or receiving sidelink communications in a particular quantity of consecutive sidelink DRX on mode durations.

In some aspects, the sidelink DRX cycle duration, the sidelink DRX on duration, and/or the sidelink DRX sleep duration of the sidelink DRX operation of the UE may be the same or different between the sidelink connected mode and the sidelink idle mode. For example, the sidelink DRX sleep mode duration may be longer in the sidelink idle mode relative to the sidelink connected mode, in which case fewer sidelink DRX on durations may be scheduled for a given time period in the sidelink idle mode relative to the sidelink connected mode.

As indicated above, FIG. 3 is provided as one or more examples. Other examples may differ from what is described with respect to FIG. 3.

Figure 4:
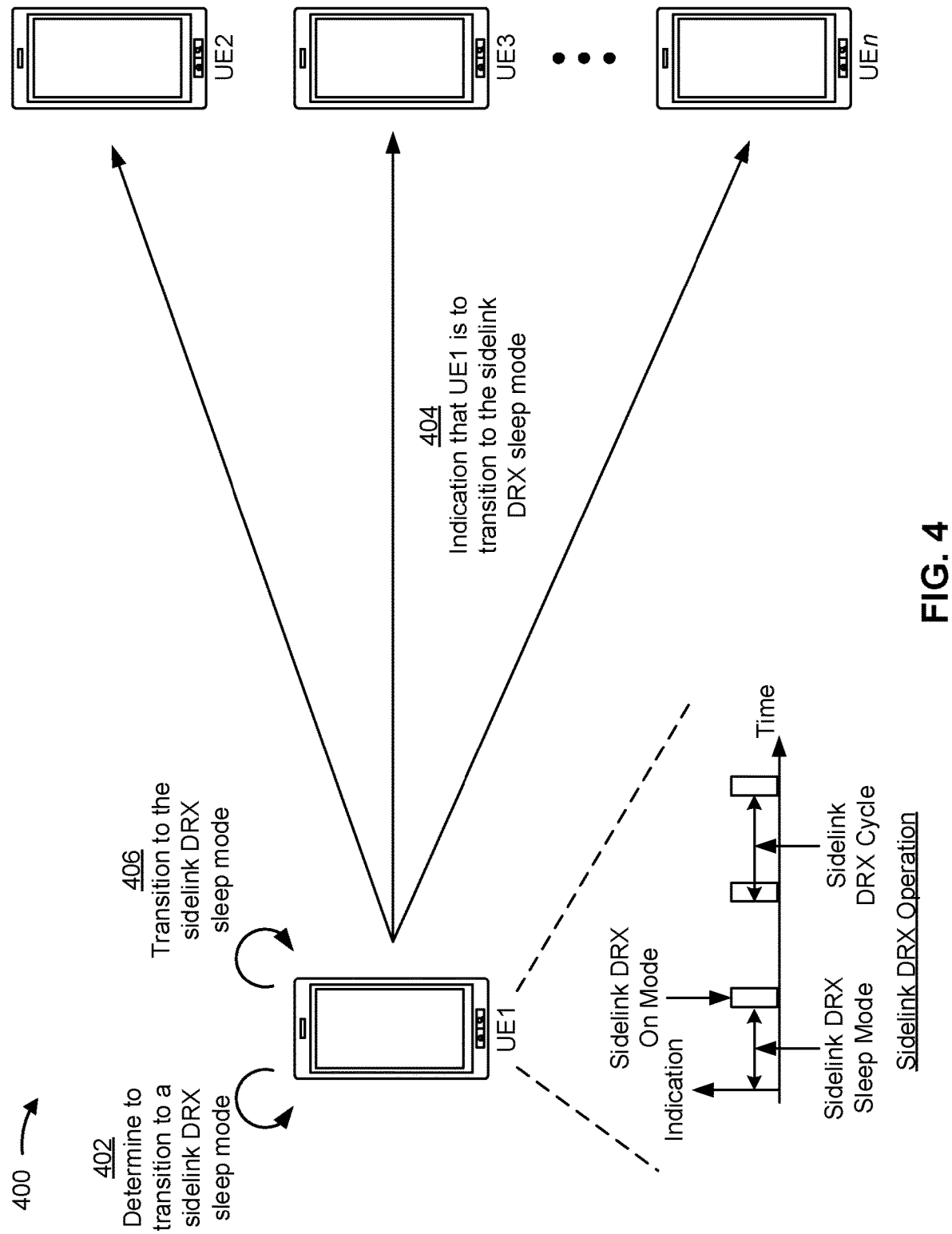

FIG. 4 is a diagram illustrating one or more examples 400 of DRX operation for sidelink communication, in accordance with various aspects of the present disclosure. As shown in FIG. 4, example(s) 400 may include sidelink communication between a plurality of UEs (e.g., UEs 120), such as UE1-UEn. In some aspects, example(s) 400 may illustrate an example of sidelink DRX operation of a UE (e.g., UE1) in a sidelink idle mode. In this case, UE1 may not be RRC connected with UE2-UEn via a sidelink.

As shown in FIG. 4, and by reference number 402, UE1 may determine to transition to a sidelink DRX sleep mode associated with sidelink DRX operation of UE1. In some aspects, UE1 may determine to transition to the sidelink DRX sleep mode based at least in part on determining to initiate sidelink DRX operation, based at least in part on determining that a sidelink DRX inactivity timer associated with sidelink DRX operation of UE1 has expired, prior to expiration of the sidelink DRX inactivity timer, and/or the like.

As further shown in FIG. 4, and by reference number 404, UE1 may transmit, to UE2-UEn, an indication that UE1 is to transition to the sidelink DRX sleep mode. In some aspects, the indication may be included in a sidelink medium access control (MAC) control element (MAC-CE) communication, a sidelink control information (SCI) communication, a sidelink RRC communication, and/or another type of sidelink communication.

In some aspects, the sidelink communication may further identify one or more parameters for the sidelink DRX operation of UE1, for the sidelink DRX sleep mode, for a sidelink DRX on mode, and/or the like. For example, the sidelink communication may identify a starting time of the sidelink DRX sleep mode (e.g., a slot and/or symbol in which the sidelink DRX sleep mode is to commence), a sidelink DRX sleep duration of the sidelink DRX sleep mode, a starting time of a sidelink DRX on mode (e.g., a slot and/or symbol in which the sidelink DRX on mode is to commence), a sidelink DRX on duration of the sidelink DRX on mode, a sidelink DRX cycle duration, a configuration for short sidelink DRX cycles and/or long sidelink DRX cycles of UE1, one or more subcarriers or component carriers that are to be disabled and/or deactivated by UE1 while UE1 is in the sidelink DRX sleep mode, and/or the like.

In some aspects, UE1 may transmit the indication based at least in part on determining to transition to the sidelink DRX sleep mode, based at least in part on determining to initiate sidelink DRX operation, based at least in part on determining that a sidelink DRX inactivity timer associated with sidelink DRX operation of UE1 has expired, prior to expiration of the sidelink DRX inactivity timer, and/or the like.

In some aspects, UE1 may transmit the indication to UE2-UEn based at least in part on UE1 and UE2-UEn being included in a same group for purposes of groupcast and/or broadcast sidelink communication. In this case, UE1 may determine to transmit the indication based at least in part on determining that no groupcast and/or broadcast sidelink communications for the group are scheduled to be transmitted and/or received.

As further shown in FIG. 4, and by reference number 406, UE1 may transition to the sidelink DRX sleep mode based at least in part on transmitting the indication to UE2-UEn. In some aspects, UE1 may remain in the sidelink DRX sleep mode for a sidelink DRX sleep duration. While in the sidelink DRX sleep mode, UE1 may refrain from monitoring for sidelink communications (e.g., physical sidelink control channel (PSCCH) communications, physical sidelink shared channel (PSSCH) communications, physical sidelink broadcast channel (PSBCH) communications, and/or other types of sidelink communications), may disable and/or deactivate one or more component carriers configured for sidelink communication, may disable and/or deactivate one or more components of UE1 (e.g., one or more transmit chain components, one or more receive chain components, and/or the like).

Moreover, UE2-UEn may refrain from transmitting sidelink communications to UE1 during the sidelink DRX sleep mode of UE1, may refrain from initiating a sidelink RRC connection with UE1 during the sidelink DRX sleep mode of UE1, and/or the like.

In some aspects, once the sidelink DRX sleep duration expires, UE1 may transition from the sidelink DRX sleep mode to the sidelink DRX on mode for the sidelink DRX on duration. In some aspects, UE1 may monitor for sidelink communications (e.g., PSCCH communications, PSSCH communications, PSBCH communication, sidelink broadcast communications, sidelink groupcast communications, and/or the like) while UE1 is in the sidelink DRX on mode. In some aspects, UE1 may terminate DRX operation of UE1 by transmitting a sidelink communication (e.g., PSCCH communications, PSSCH communications, PSBCH communication, sidelink broadcast communications, sidelink groupcast communications, and/or the like) while UE1 is in the sidelink DRX on mode.

In some aspects, UE1 may transmit an indication of a modification of the sidelink DRX operation of UE1 while UE1 is in the sidelink DRX on mode. In some aspects, the modification of the sidelink DRX operation of UE1 may include a modification to any of the one or more parameters for the sidelink DRX operation of UE1 described above. In some aspects, UE1 may receive sidelink RRC connection setup requests from UE2-UEn while UE1 is in the sidelink DRX on mode.

In some aspects, UE1 may continue with sidelink DRX operation in one or more subsequent sidelink DRX cycles, may terminate sidelink DRX operation of UE1, and/or the like.

In this way, UE1 may operate in a sidelink idle mode, and may initiate sidelink DRX operation by transmitting, to one or more other UEs (e.g., UE2-UEn), an indication that UE1 is to enter sidelink DRX operation, is to transition to a sidelink DRX sleep mode, and/or the like, may initiate sidelink DRX operation, may transition to the sidelink DRX sleep mode, and/or the like. In this way, UE1 is capable of notifying the other UEs of the sidelink DRX operation of UE1, and the other UEs may refrain from transmitting sidelink communications to UE1 while UE1 is operating in the sidelink DRX sleep mode, may transmit sidelink communications to UE1 and/or may establish sidelink RRC connections with UE1 while UE1 is operating in a sidelink DRX on mode, and/or the like.

As indicated above, FIG. 4 is provided as one or more examples. Other examples may differ from what is described with respect to FIG. 4.

Figure 5:
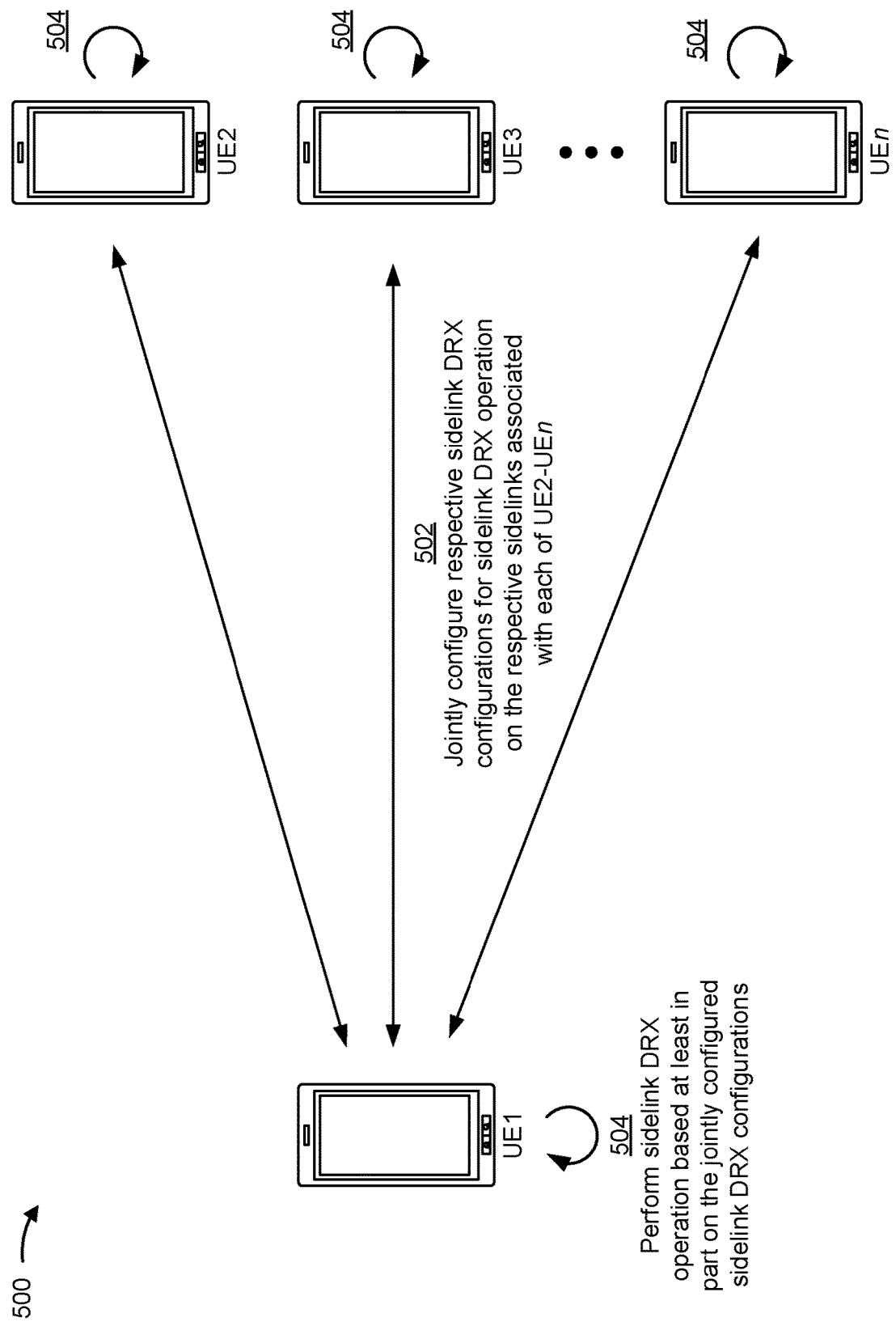

FIG. 5 is a diagram illustrating one or more examples 500 of DRX operation for sidelink communication, in accordance with various aspects of the present disclosure. As shown in FIG. 5, example(s) 500 may include sidelink communication between a plurality of UEs (e.g., UE 120), such as UE1-UEn. In some aspects, example(s) 500 may illustrate an example of sidelink DRX operation of a UE (e.g., UE1) in a sidelink connected mode. In this case, UE1 may be sidelink RRC connected with UE2-UEn via a respective sidelinks.

As shown in FIG. 5, and by reference number 502, UE1 may jointly configure, with UE2-UEn, respective sidelink DRX configurations for sidelink DRX operation on the respective sidelinks associated with each of UE2-UEn. For example, UE1 may jointly configure, with UE2, a sidelink DRX configuration for sidelink DRX operation of UE1 and UE2 on the sidelink associated with UE2, may jointly configure, with UE3, a sidelink DRX configuration for sidelink DRX operation of UE1 and UE3 on the sidelink associated with UE3, and so on. In this way, UE1 may coordinate and/or synchronize sidelink DRX operation of UE1 and UE2 on the sidelink between UE1 and UE2, may coordinate and/or synchronize sidelink DRX operation of UE1 and UE3 on the sidelink between UE1 and UE3, and so on.

As another example, UE1 may jointly configure, with UE2-UEn, sidelink DRX configurations for sidelink DRX operation of UE1 and UE2 on the sidelink associated with UE2, for sidelink DRX operation of UE1 and UE3 on the sidelink associated with UE3, and so on. In this way, UE1 may coordinate and/or synchronize sidelink DRX operation of UE1-UEn such that sidelink DRX operation of UE1-UEn are jointly coordinated and/or synchronized.

In some aspects, the jointly configured sidelink DRX configurations may be coordinated and/or synchronized such that the jointly configured sidelink DRX configurations include one or more same or common parameters for sidelink DRX operation, such as the same or common sidelink DRX inactivity timer parameter, the same or common sidelink DRX on duration, the same or common starting time for a sidelink DRX on mode, the same or common sidelink DRX sleep duration, the same or common starting time for a sidelink DRX sleep mode, the same or common sidelink DRX cycle duration, the same or common timing alignment of sidelink DRX cycles (e.g., such that sidelink DRX cycles for each jointly configured sidelink DRX configuration have the same starting time and same sidelink DRX cycle duration), the same or common configuration of short and long sidelink DRX cycles, and/or the like.

In some aspects, UE1 may jointly configure a sidelink DRX configuration with one or more of UE2-UEn by transmitting an indication of a candidate sidelink DRX configuration generated by UE1 and receiving one or more another candidate sidelink DRX configurations generated by the one or more of UE2-UEn. UE1 may determine whether the candidate sidelink DRX configuration and the one or more another candidate sidelink DRX configurations match or are different. In some aspects, UE1 may determine that the candidate sidelink DRX configuration and the one or more another candidate sidelink DRX configurations match if the candidate sidelink DRX configuration and the one or more another candidate sidelink DRX configurations include the same parameters for sidelink DRX operation. In some aspects, UE1 may determine that the candidate sidelink DRX configuration and the one or more another candidate sidelink DRX configurations are different if the candidate sidelink DRX configuration and the one or more another candidate sidelink DRX configurations include one or more different parameters for sidelink DRX operation.

If UE1 and/or the one or more of UE2-UEn determine that the candidate sidelink DRX configuration and the one or more another candidate sidelink DRX configurations are different, UE1 and the one or more of UE2-UEn may select one of the candidate sidelink DRX configurations as the sidelink DRX configuration based at least in part on which UE of UE1 and the one or more of UE2-UEn is the most active UE (e.g., is transmitting and/or receiving sidelink communications more frequently), based at least in part on a respective identifier associated with each UE1 and the one or more of UE2-UEn (e.g., the candidate sidelink DRX configuration generated by the UE with the highest, greatest, or largest, layer-2 and/or another type of identifier may be selected as the sidelink DRX configuration), and/or the like.

In some aspects, UE1-UEn may exchange sidelink communications that indicate the jointly configured sidelink DRX configurations for each UE of UE1-UEn. For example, each of UE1-UEn may transmit a MAC-CE communication, an SCI communication, an RRC communication, a mac-config as part of a PC5RRCReconfig communication, and/or another type of sidelink communication that indicates the jointly configured sidelink DRX configurations associated with the UE.

As further shown in FIG. 5, and by reference number 504, UE1-UEn may perform sidelink DRX operation based at least in part on the jointly configured sidelink DRX configurations. For example, UE1 and UE2 may transition to a sidelink DRX sleep mode based at least in part on jointly configured sidelink DRX configurations for the sidelink between UE1 and UE2, may transmit respective indications that UE1 and UE2 are to transition to the sidelink DRX sleep mode (e.g., based at least in part on expiration of a sidelink DRX inactivity timer identified in the jointly configured sidelink DRX configurations), and/or the like. As another example, UE1 and UE2 may transition to a sidelink DRX on mode based at least in part on expiration of a sidelink DRX sleep mode duration identified in the jointly configured sidelink DRX configurations, may monitor for sidelink communications while in the sidelink DRX on mode (e.g., by determining if any sidelink communications match a layer-1 and/or another type of identifier associated with UE1 or UE2), may transmit sidelink communications while in the sidelink DRX on mode, may terminate sidelink DRX operation while in the sidelink DRX on mode, and/or the like.

In some aspects, when a UE (e.g., UE1) transitions from a sidelink DRX sleep mode to a sidelink DRX on mode that is aligned with a sidelink DRX on mode of a plurality of other UEs (e.g., UE2-UEn), the UE may receive a large quantity of sidelink communications while in the sidelink DRX on mode, which may cause the sidelink communications to collide at the UE if the transmission of the sidelink communications is not coordinated. Accordingly, the UE may configure the other UEs to stagger transmission of the sidelink communications during a sidelink DRX on duration of the sidelink DRX on mode such that the sidelink communications are received in respective time-domain resources (e.g., respective symbols, respective slots, and/or the like), which reduces the likelihood that a collision will occur in the sidelink DRX on mode.

Additionally and/or alternatively, the UE may sequentially poll each of the other UEs at the beginning of the sidelink DRX on duration to determine whether each of the other UEs is to transmit a sidelink communication to the UE when the UE is in the sidelink DRX on mode. In this case, the other UEs may transmit sidelink communications in response to the polling such that the sidelink communications are transmitted to the UE in a staggered manner.

In some aspects, when a UE (e.g., UE1) transitions from a sidelink DRX sleep mode to a sidelink DRX on mode, the UE may transmit one or more sidelink communications to another UE (e.g., UE2) that is also operating in a sidelink DRX on mode. In this case, the other UE may be configured to transmit a sidelink communication in response to receiving the one or more sidelink communications from the UE, may be configured to provide hybrid automatic repeat request (HARD) feedback to the UE based at least in part on the one or more sidelink communications, and/or the like. In some aspects, the UE may not receive a response for the one or more sidelink communications from the other UE. This may occur, for example, where the other UE does not have sidelink communications to transmit to the UE or where the other UE is out of range of the UE and/or has experienced a radio link failure.

To detect a radio link failure associated with the other UE, the UE and the other UE may exchange one or more keepalive communications while in the sidelink DRX on mode. In some aspects, the UE may detect a radio link failure associated with the other UE based at least in part on receiving a quantity of keepalive communications, in a particular time duration, that does not satisfy a threshold quantity. In some aspects, the UE may detect a radio link failure associated with the other UE based at least in part on not receiving a keepalive communication within a particular time duration. In some aspects, the particular time duration may be based at least in part on a sidelink DRX on duration of the sidelink DRX on mode, a sidelink DRX cycle duration configured for sidelink DRX operation of the UE and the other UE, and/or the like.

In some aspects, a UE (e.g., UE2) may break, disrupt, and/or otherwise discontinue coordinated and/or synchronized sidelink DRX operation with another UE (e.g., UE1). For example, the UE may determine to transition from a sidelink DRX sleep mode to a sidelink DRX on mode prior to expiration of a sidelink DRX sleep duration. As another example, the UE may determine to delay or refrain from transitioning from a sidelink DRX on mode to a sidelink DRX sleep mode (e.g., in order to communicate with a different UE (e.g., UE3)). In this case, when the other UE transitions from a sidelink DRX sleep mode to a sidelink DRX on mode, the other UE may be unaware of the status of the UE. For example, the other UE may not know whether the UE is operating in a sidelink DRX sleep mode or a sidelink DRX on mode. This may also occur where the UE and the other UE are not sidelink DRX operation coordinated and/or synchronized. For example, the UE may transition to a sidelink DRX sleep mode while the other UE is in a sidelink DRX sleep mode, in which case the other UE may not receive an indication that the UE is transitioning to the sidelink DRX sleep mode.

In the above cases, where the other UE may not be sidelink DRX operation coordinated and/or synchronized and/or may not be aware of the sidelink DRX operation mode of the UE, the other UE may attempt to page the UE when the other UE is in a sidelink DRX on mode prior to attempting to transmit sidelink communications to the UE. In this case, the other UE may transmit a paging communication to the UE (e.g., a wake-up signal (WUS) and/or another type of paging communication), and the other UE may transmit a sidelink communication to the UE if the UE responds to the paging communication (e.g., with an acknowledgement, such as a WUS acknowledgement (WUS-ACK) and/or another type of acknowledgement). If the UE does not respond to the initial paging communication, the UE may periodically transmit paging communications until the UE responds. In some aspects, the other UE may increase the frequency at which the paging communications are transmitted, such that the time duration between paging communications gradually decreases to avoid missing the sidelink DRX on duration of the UE.

Additionally and/or alternatively, if the other UE is communicatively connected with a BS, the other UE may transmit a request for the sidelink DRX operation mode of the UE to the BS (e.g., a serving BS of the other UE, a serving BS of the UE, and/or the like), and the BS may transmit an indication of the sidelink DRX operation mode of the UE to the other UE such that the other UE is made aware of the sidelink DRX operation mode of the UE. In this case, the other UE may delay sidelink communication with the UE, may schedule a sidelink transmission of a sidelink communication to the UE, and/or the like based at least in part on determining (e.g., based at least in part on the indication of the sidelink DRX operation mode of the UE) that the UE is in a sidelink DRX sleep mode, may transmit the sidelink communication to the UE based at least in part on determining that the UE is in a sidelink DRX on mode, and/or the like.

In this way, UE1 may operate in a sidelink connected mode (e.g., UE1 may be communicatively connected with UE2-UEn), and may coordinate and/or synchronize sidelink DRX operation with UE2-UEn. In this way, UE1 and UE2-UEn may synchronize sidelink DRX sleep modes and/or sidelink DRX on modes to increase the battery life conservation of UE1 and UE2-UEn provided by sidelink DRX operation, may decrease delays in sidelink communications and/or may decrease the quantity of dropped sidelink communications due to uncoordinated and/or unsynchronized sidelink DRX operation, and/or the like.

As indicated above, FIG. 5 is provided as one or more examples. Other examples may differ from what is described with respect to FIG. 5.

Figure 6:
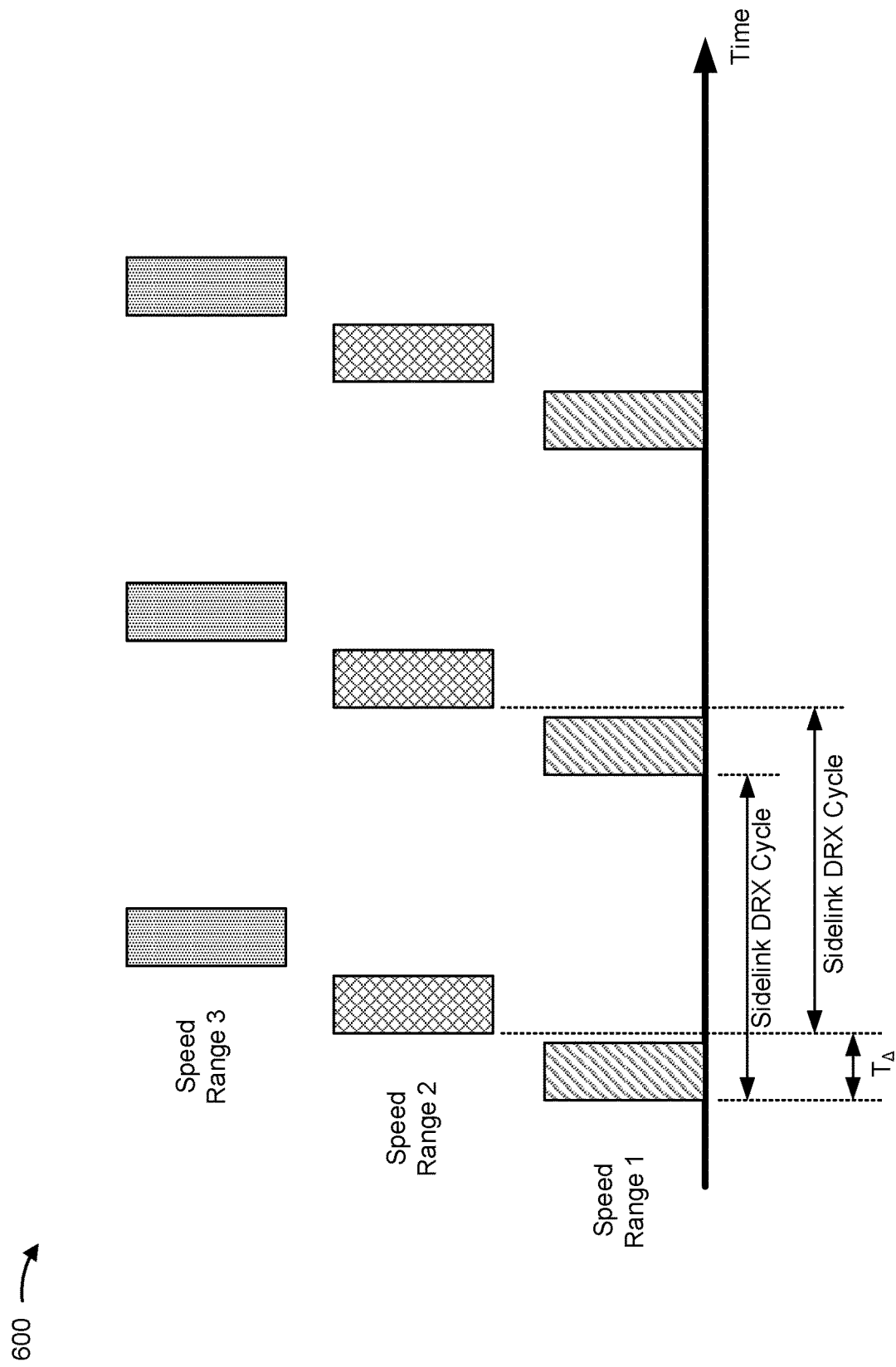

FIG. 6 is a diagram illustrating one or more examples 600 of DRX operation for sidelink communication, in accordance with various aspects of the present disclosure. In some aspects, example(s) 600 may illustrate an example of sidelink DRX operation of one or more UEs (e.g., UE 120).

As shown in FIG. 6, a UE may be configured to perform sidelink DRX operation based at least in part on a sidelink DRX configuration that is based at least in part on a speed of travel of the UE. The UE may be configured with a plurality of sidelink DRX configurations, where each of the plurality of sidelink DRX configurations is associated with a respective speed range. For example, a first sidelink DRX configuration may be associated with speed range 1 (e.g., 21-30 kilometers per hour (km/hr)), a second sidelink DRX configuration may be associated with speed range 2 (e.g., 31-40 km/hr), a third sidelink DRX configuration may be associated with speed range 3 (e.g., 41-50 km/hr), and so on. The UE may perform sidelink operation based at least in part on the sidelink DRX configuration associated with the speed range in which the speed at which the UE is traveling is included.

In some aspects, each of the plurality of sidelink DRX configurations may be associated with one or more different sidelink DRX operation parameters. This permits UEs associated with similar modes of travel (e.g., UEs associated with travel by vehicle, UEs associated with travel by cycle, and/or the like) to coordinate and/or synchronize sidelink DRX operation. As shown in FIG. 6, for example, the starting time of sidelink DRX cycles for each speed range may be staggered in the time domain by a time duration TA. In some aspects, TA may be the same for each speed range (e.g., the sidelink DRX cycles for each speed range may be staggered by the same time duration). In some aspects, TA may be different for one or more speed ranges (e.g., the sidelink DRX cycles for one or more speed range may be staggered by different time durations). In some aspects, other parameters for sidelink DRX operation, such as a starting time of a sidelink DRX on mode, a starting time of a sidelink DRX sleep duration, a sidelink DRX on duration, a sidelink DRX sleep duration, a sidelink DRX cycle duration, and/or the like may be the same or different across one or more speed ranges.

As indicated above, FIG. 6 is provided as one or more examples. Other examples may differ from what is described with respect to FIG. 6.

FIG. 7 is a diagram illustrating an example process 700 performed, for example, by a UE, in accordance with various aspects of the present disclosure. Example process 700 is an example where a UE (e.g., UE 120) performs operations associated with discontinuous reception operation for sidelink communication.

As shown in FIG. 7, in some aspects, process 700 may include transmitting an indication that the UE is to transition to a sidelink DRX sleep mode (block 710). For example, the UE (e.g., using receive processor 258, transmit processor 264, controller/processor 280, memory 282, and/or the like) may transmit an indication that the UE is to transition to a sidelink DRX sleep mode, as described above.

As further shown in FIG. 7, in some aspects, process 700 may include transitioning to the sidelink DRX sleep mode based at least in part on transmitting the indication (block 720). For example, the UE (e.g., using receive processor 258, transmit processor 264, controller/processor 280, memory 282, and/or the like) may transition to the sidelink DRX sleep mode based at least in part on transmitting the indication, as described above.

Process 700 may include additional aspects, such as any single aspect or any combination of aspects described below and/or in connection with one or more other processes described elsewhere herein.

In a first aspect, transmitting the indication that the UE is to transition to the sidelink DRX sleep mode comprises transmitting the indication based at least in part on an expiration of a sidelink DRX inactivity timer or transmitting the indication prior to the expiration of the sidelink DRX inactivity timer. In a second aspect, alone or in combination with the first aspect, process 700 further comprises transitioning from the sidelink DRX sleep mode to a sidelink DRX on mode at an expiration of a sidelink DRX sleep duration; and at least one of monitoring for a PSCCH communication when in the sidelink DRX on mode, terminating sidelink DRX operation of the UE by transmitting a PSCCH communication when in the sidelink DRX on mode, transmitting an indication of a modification of the sidelink DRX operation of the UE when in the sidelink DRX on mode, or receiving a sidelink radio resource control connection setup request when in the sidelink DRX on mode.

In a third aspect, alone or in combination with one or more of the first and second aspects, the sidelink DRX sleep duration is based at least in part on a short sidelink DRX cycle or a long sidelink DRX cycle. In a fourth aspect, alone or in combination with one or more of the first through third aspects, transmitting the indication that the UE is to transition to the sidelink DRX sleep mode comprises transmitting the indication based at least in part on a sidelink DRX configuration of a plurality of sidelink DRX configurations configured for the UE, the plurality of sidelink DRX configurations being associated with respective sidelinks of the UE. In a fifth aspect, alone or in combination with one or more of the first through fourth aspects, the plurality of sidelink DRX configurations include at least one of a common sidelink DRX inactivity timer parameter, a common sidelink DRX cycle duration parameter, or a common sidelink DRX on duration parameter.

In a sixth aspect, alone or in combination with one or more of the first through fifth aspects, process 700 further comprises jointly configuring the sidelink DRX configuration with one or more other UEs. In a seventh aspect, alone or in combination with one or more of the first through sixth aspects, jointly configuring the sidelink DRX configuration with the one or more other UEs comprises transmitting, to a first other UE of the one or more other UEs, an indication of a first candidate sidelink DRX configuration; receiving, from the first other UE, an indication of a second candidate sidelink DRX configuration, the first candidate sidelink DRX configuration and the second candidate sidelink DRX configuration being different DRX configurations; and selecting the first candidate sidelink DRX configuration or the second candidate sidelink DRX configuration based at least in part on at least one of whether the UE is more active relative to the first other UE, or an identifier associated with the UE and an identifier associated with the first other UE. In an eighth aspect, alone or in combination with one or more of the first through seventh aspects, respective sidelink DRX cycles, for each of the plurality of sidelink DRX configurations, are timing aligned.

In a ninth aspect, alone or in combination with one or more of the first through eighth aspects, transmitting the indication that the UE is to transition to the sidelink DRX sleep mode comprises transmitting the indication in a MAC-CE communication. In a tenth aspect, alone or in combination with one or more of the first through ninth aspects, process 700 further comprises transitioning from the sidelink DRX sleep mode to a sidelink DRX on mode at an expiration of a sidelink DRX sleep duration; and transmitting a plurality of paging communications to another UE while the UE is in the sidelink DRX on mode. In an eleventh aspect, alone or in combination with one or more of the first through tenth aspects, transmitting the plurality of paging communications to the other UE when in the sidelink DRX on mode comprises transmitting the plurality of paging communications at an increasing frequency.

In a twelfth aspect, alone or in combination with one or more of the first through eleventh aspects, process 700 further comprises transitioning from the sidelink DRX sleep mode to a sidelink DRX on mode at an expiration of a sidelink DRX sleep duration; and receiving, when in the sidelink DRX on mode, respective sidelink communications from each of a plurality of other UEs, the respective sidelink communications from each of the plurality of other UEs being received in respective time-domain resources. In a thirteenth aspect, alone or in combination with one or more of the first through twelfth aspects, process 700 further comprises transitioning from the sidelink DRX sleep mode to a sidelink DRX on mode at an expiration of a sidelink DRX sleep duration; and polling, when in the sidelink DRX on mode, each of a plurality of other UEs to determine whether each of the plurality of other UEs is to transmit a sidelink communication to the UE when in the sidelink DRX on mode.

In a fourteenth aspect, alone or in combination with one or more of the first through thirteenth aspects, transmitting the indication that the UE is to transition to the sidelink DRX sleep mode comprises transmitting the indication based at least in part on a sidelink DRX configuration configured for the UE, a starting time of a sidelink DRX on mode, identified in the sidelink DRX configuration, being based at least in part on a speed at which the UE is traveling. In a fifteenth aspect, alone or in combination with one or more of the first through fourteenth aspects, transmitting the indication that the UE is to transition to the sidelink DRX sleep mode comprises transmitting the indication based at least in part on a sidelink DRX configuration configured for the UE, a starting time of a sidelink DRX cycle duration, identified in the sidelink DRX configuration, being based at least in part on a speed at which the UE is traveling.

In a sixteenth aspect, alone or in combination with one or more of the first through fifteenth aspects, the indication that the UE is to transition to the sidelink DRX sleep mode identifies one or more component carriers, associated with the UE, that are to be deactivated when the UE is in the sidelink DRX sleep mode. In a seventeenth aspect, alone or in combination with one or more of the first through sixteenth aspects, process 700 further comprises transitioning from the sidelink DRX sleep mode to a sidelink DRX on mode at an expiration of a sidelink DRX sleep duration; and transmitting one or more keepalive communications, to another UE, when in the sidelink DRX on mode. In an eighteenth aspect, alone or in combination with one or more of the first through seventeenth aspects, process 700 further comprises detecting, based at least in part on the one or more keepalive communications, a radio link failure associated with a sidelink between the UE and the other UE.

In a nineteenth aspect, alone or in combination with one or more of the first through eighteenth aspects, a time duration between keepalive communications is based at least in part on a common sidelink DRX cycle associated with the UE and the other UE. In a twentieth aspect, alone or in combination with one or more of the first through nineteenth aspects, process 700 further comprises transitioning from the sidelink DRX sleep mode to a sidelink DRX on mode at an expiration of a sidelink DRX sleep duration; transmitting, to a BS, a request for a sidelink DRX operation mode of the other UE; receiving, from the BS, an indication of the sidelink DRX operation mode of the other UE; and delaying sidelink communication with the other UE or scheduling a sidelink transmission to the other UE based at least in part on receiving the indication of the sidelink DRX operation mode of the other UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving, from another UE, an indication of a first sidelink discontinuous reception (DRX) configuration;
    transmitting, to a base station, information indicating the first DRX configuration;
    receiving, from the base station, an indication of a second sidelink DRX configuration;
    transmitting, to the other UE, the indication of the second sidelink DRX configuration;
    transmitting an indication that the UE is to transition to a sidelink DRX sleep mode;
    transitioning to the sidelink DRX sleep mode based at least in part on transmitting the indication;
    transitioning from the sidelink DRX sleep mode to a sidelink DRX on mode; and
    transmitting one or more sidelink communications, to the other UE, when in the sidelink DRX on mode.

2. The method of claim 1, wherein transmitting the indication that the UE is to transition to the sidelink DRX sleep mode comprises:
    transmitting the indication based at least in part on an expiration of a sidelink DRX inactivity timer, or
    transmitting the indication prior to the expiration of the sidelink DRX inactivity timer.

3. The method of claim 1, further comprising:
    at least one of:
        monitoring for a physical sidelink control channel (PSCCH) communication when in the sidelink DRX on mode,
        terminating sidelink DRX operation of the UE by transmitting a PSCCH communication when in the sidelink DRX on mode,
        transmitting an indication of a modification of the sidelink DRX operation of the UE when in the sidelink DRX on mode, or
        receiving a sidelink radio resource control connection setup request when in the sidelink DRX on mode.

4. The method of claim 3, wherein the sidelink DRX sleep duration is based at least in part on a short sidelink DRX cycle or a long sidelink DRX cycle.

5. The method of claim 1, wherein transmitting the indication that the UE is to transition to the sidelink DRX sleep mode comprises:
    transmitting the indication based at least in part on a sidelink DRX configuration of a plurality of sidelink DRX configurations configured for the UE,
    wherein the plurality of sidelink DRX configurations are associated with respective sidelinks of the UE.

6. The method of claim 5, wherein the plurality of sidelink DRX configurations include at least one of:
    a common sidelink DRX inactivity timer parameter,
    a common sidelink DRX cycle duration parameter, or
    a common sidelink DRX on duration parameter.

7. The method of claim 5, further comprising:
    jointly configuring the sidelink DRX configuration with the other UE.

8. The method of claim 7, wherein jointly configuring the sidelink DRX configuration with the other UE comprises:
    transmitting, to the other UE, an indication of the second sidelink DRX configuration,
        wherein the indication of the first sidelink DRX configuration is received based at least in part on transmitting the indication of the second sidelink DRX configuration; and
    selecting the first sidelink DRX configuration or the second sidelink DRX configuration as the selected sidelink DRX configuration based at least in part on at least one of:
        whether the UE is more active relative to the other UE, or
        an identifier associated with the UE and an identifier associated with the other UE.

9. The method of claim 5, wherein respective sidelink DRX cycles, for each of the plurality of sidelink DRX configurations, are timing aligned.

10. The method of claim 1, wherein transmitting the indication that the UE is to transition to the sidelink DRX sleep mode comprises:

transmitting the indication in a sidelink medium access control (MAC) control element (MAC-CE) communication.

11. The method of claim 1, further comprising:
transmitting a plurality of paging communications to the other UE while the UE is in the sidelink DRX on mode.

12. The method of claim 11, wherein transmitting the plurality of paging communications to the other UE when in the sidelink DRX on mode comprises:
transmitting the plurality of paging communications at an increasing frequency.

13. The method of claim 1, further comprising:
receiving, when in the sidelink DRX on mode, respective sidelink communications from each of a plurality of other UEs,
wherein the respective sidelink communications from each of the plurality of other UEs are received in respective time-domain resources.

14. The method of claim 1, further comprising:
polling, when in the sidelink DRX on mode, each of a plurality of other UEs to determine whether each of the plurality of other UEs is to transmit a sidelink communication to the UE when in the sidelink DRX on mode.

15. The method of claim 1, wherein transmitting the indication that the UE is to transition to the sidelink DRX sleep mode comprises:
transmitting the indication based at least in part on the second sidelink DRX configuration.

16. The method of claim 1, wherein transmitting the indication that the UE is to transition to the sidelink DRX sleep mode comprises:
transmitting the indication based at least in part on the second sidelink DRX configuration,
wherein a starting time of a sidelink DRX cycle duration or a starting time of a sidelink DRX on mode, identified in the second sidelink DRX configuration, is based at least in part on a speed at which the UE is traveling.

17. The method of claim 1, wherein the indication that the UE is to transition to the sidelink DRX sleep mode identifies one or more component carriers, associated with the UE, that are to be deactivated when the UE is in the sidelink DRX sleep mode.

18. The method of claim 1, wherein transitioning from the sidelink DRX sleep mode to the sidelink DRX on mode comprises:
transitioning from the sidelink DRX sleep mode to the sidelink DRX on mode at an expiration of a sidelink DRX sleep duration.

19. The method of claim 18, wherein a time duration between sidelink communications, of the one or more sidelink communications, is based at least in part on a common sidelink DRX cycle associated with the UE and the other UE.

20. The method of claim 1, further comprising:
detecting, based at least in part on the one or more sidelink communications, a radio link failure associated with a sidelink between the UE and the other UE.

21. The method of claim 1, further comprising:
transmitting, to a base station (BS), sidelink DRX assistance information associated with the other UE,
wherein the sidelink DRX assistance information associated with the other UE includes the information indicating the first sidelink DRX configuration.

22. A user equipment (UE) for wireless communication, comprising:

a memory; and
one or more processors coupled to the memory, the one or more processors configured to:
receive, from another UE, an indication of a first sidelink discontinuous reception (DRX) configuration;
transmit, to a base station, information indicating the first DRX configuration;
receive, from the base station, an indication of a second sidelink DRX configuration;
transmit, to the other UE, the indication of the second sidelink DRX configuration;
transmit an indication that the UE is to transition to a sidelink DRX sleep mode;
transition to the sidelink DRX sleep mode based at least in part on transmitting the indication;
transition from the sidelink DRX sleep mode to a sidelink DRX on mode; and
transmit one or more sidelink communications, to the other UE, when in the sidelink DRX on mode.

23. The UE of claim 22, wherein the one or more processors, when transmitting the indication that the UE is to transition to the sidelink DRX sleep mode, are configured to:
transmit the indication based at least in part on an expiration of a sidelink DRX inactivity timer, or
transmit the indication prior to the expiration of the sidelink DRX inactivity timer.

24. The UE of claim 22, wherein the one or more processors are further configured to:
at least one of:
monitor for a physical sidelink control channel (PSCCH) communication when in the sidelink DRX on mode,
terminate sidelink DRX operation of the UE by transmitting a PSCCH communication when in the sidelink DRX on mode,
transmit an indication of a modification of the sidelink DRX operation of the UE when in the sidelink DRX on mode, or
receive a sidelink radio resource control connection setup request when in the sidelink DRX on mode.

25. The UE of claim 24, wherein the sidelink DRX sleep duration is based at least in part on a short sidelink DRX cycle or a long sidelink DRX cycle.

26. The UE of claim 22, wherein the one or more processors, when transmitting the indication that the UE is to transition to the sidelink DRX sleep mode, are configured to:
transmit the indication based at least in part on a sidelink DRX configuration of a plurality of sidelink DRX configurations configured for the UE,
wherein the plurality of sidelink DRX configurations are associated with respective sidelinks of the UE.

27. A non-transitory computer-readable medium storing one or more instructions for wireless communication, the one or more instructions comprising:
one or more instructions that, when executed by one or more processors of a user equipment (UE), cause the one or more processors to:
receive, from another UE, an indication of a first sidelink discontinuous reception (DRX) configuration;
transmit, to a base station, information indicating the first DRX configuration;
receive, from the base station, an indication of a second sidelink DRX configuration;

transmit, to the other UE, the indication of the second sidelink DRX configuration;
transmit an indication that the UE is to transition to a sidelink DRX sleep mode;
transition to the sidelink DRX sleep mode based at least in part on transmitting the indication;
transition from the sidelink DRX sleep mode to a sidelink DRX on mode; and
transmit one or more sidelink communications, to the other UE, when in the sidelink DRX on mode.

28. The non-transitory computer-readable medium of claim 27, wherein the one or more instructions, that cause the one or more processors to transmit the indication that the UE is to transition to the sidelink DRX sleep mode, cause the one or more processors to:
transmit the indication based at least in part on a sidelink DRX configuration configured for the UE,
wherein a starting time of a sidelink DRX cycle duration, identified in the sidelink DRX configuration, is based at least in part on a speed at which the UE is traveling.

29. An apparatus for wireless communication, comprising:
means for receiving, from another apparatus, an indication of a first sidelink discontinuous reception (DRX) configuration;
means for transmitting, to a base station, information indicating the first DRX configuration;
means for receiving, from the base station, an indication of a second sidelink DRX configuration;
means for transmitting, to the other apparatus, the indication of the second sidelink DRX configuration;
means for transmitting an indication that the apparatus is to transition to a sidelink DRX sleep mode;
means for transitioning to the sidelink DRX sleep mode based at least in part on transmitting the indication;
means for transitioning from the sidelink DRX sleep mode to a sidelink DRX on mode; and
means for transmitting one or more sidelink communications, to the other apparatus, when in the sidelink DRX on mode.

30. The apparatus of claim 29, further comprising:
means for transmitting, to a base station (BS), sidelink DRX assistance information associated with the other apparatus,
wherein the sidelink DRX assistance information associated with the other apparatus includes the information indicating the first sidelink DRX configuration.

* * * * *